US009250073B2

(12) United States Patent
Amor et al.

(10) Patent No.: US 9,250,073 B2
(45) Date of Patent: Feb. 2, 2016

(54) METHOD AND SYSTEM FOR POSITION RAIL TROLLEY USING RFID DEVICES

(75) Inventors: Miguel Amor, Thornton, CO (US); Martin Holmgren, Boulder, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 1040 days.

(21) Appl. No.: 13/225,003

(22) Filed: Sep. 2, 2011

(65) Prior Publication Data
US 2013/0060520 A1    Mar. 7, 2013

(51) Int. Cl.
| | | |
|---|---|---|
| G01F 15/00 | (2006.01) | |
| G01C 15/00 | (2006.01) | |
| G01S 17/08 | (2006.01) | |
| G01S 5/00 | (2006.01) | |
| B61L 23/04 | (2006.01) | |
| B61L 25/02 | (2006.01) | |

(52) U.S. Cl.
CPC ............ *G01C 15/008* (2013.01); *G01S 5/0018* (2013.01); *G01S 17/08* (2013.01); *B61L 23/047* (2013.01); *B61L 25/025* (2013.01); *B61L 25/026* (2013.01)

(58) Field of Classification Search
CPC ... B61L 23/047; B61L 2205/02; B61L 27/04; B61L 25/025; G01S 17/08; G01S 5/0018
USPC ............. 702/154, 150; 340/572.1, 10.1, 10.6; 235/492, 375, 383
See application file for complete search history.

(56) References Cited

U.S. PATENT DOCUMENTS

| | | | |
|---|---|---|---|
| 5,471,218 A | 11/1995 | Talbot et al. | |
| 5,923,287 A | 7/1999 | Lennen | |
| 6,529,828 B1 | 3/2003 | Williams et al. | |
| 8,583,313 B2* | 11/2013 | Mian ................. | G05D 1/0229 700/245 |
| 2006/0114104 A1* | 6/2006 | Scaramozzino ............ 340/10.2 | |
| 2007/0008129 A1* | 1/2007 | Soliman .................... 340/572.1 | |
| 2007/0139262 A1 | 6/2007 | Scherzinger | |
| 2009/0289120 A1 | 11/2009 | Hanson | |
| 2012/0136630 A1* | 5/2012 | Murphy ................. | F03D 1/003 702/188 |

OTHER PUBLICATIONS

Yan et al., Application of RFID technology in railway track inspection, 2009.*
Andreas, Railway surveying—A case study of the GRP 5000, Mar. 2011.*
Seppo Makitupa, RFID in Rail, Rolling Stock Monitoring in Finland, Aug. 27, 2013.*
U.S. Appl. No. 13/225,363, filed Sep. 2, 2011, Butler.
Lemaire, T., et al., "Vision-Based SLAM: Stereo and Monocular Approaches", International Journal of Computer Vision, 2007, vol. 74, No. 3, pp. 343-364.
Kohler, M., et al. "TrackSense: Infrastructure Free Precise Indoor Positioning Using Projected Patterns",2007, LNCS 4480, pp. 334-350.

* cited by examiner

*Primary Examiner* — John Breene
*Assistant Examiner* — Lynda Dinh
(74) *Attorney, Agent, or Firm* — Kilpatrick Townsend & Stockton LLP

(57) ABSTRACT

A method of determining a gauge and a tilt of a rail track at a location includes providing a rail trolley including a processor, a memory coupled to the processor, an RFID reader, a gauge sensor, and a tilt sensor and positioning the rail trolley on the rail track at the location. The method also includes interrogating one or more RFID tags positioned along the rail track and determining, using the processor, a fixed location associated with each of the one or more RFID tags. The method further includes determining, using the processor, the location of the rail trolley in relation to the fixed locations associated with each of the one or more RFID tags and determining the gauge and tilt of the rail track at the location of the rail trolley.

13 Claims, 10 Drawing Sheets

METHOD AND SYSTEM FOR POSITION RAIL TROLLEY USING RFID DEVICES

CROSS-REFERENCES TO RELATED APPLICATIONS

The following two regular U.S. patent applications (including this one) are being filed concurrently, and the entire disclosure of the other application is incorporated by reference into this application for all purposes:

Application Ser. No. 13/225,003, filed on Sep. 2, 2011, entitled "Method and System for Position Determination Using RFID Devices"; and Application Ser. No. 13/225,363, filed on Sep. 2, 2011, entitled "Dispensable Smart Target/Re-Usable Smart Target.".

BACKGROUND OF THE INVENTION

Track recording vehicles have been used to measure different attributes of a railway track. These vehicles, which can be referred to as track geometry trolleys, are typically expensive to purchase as well as to operate. As a result, railway maintenance staff typically only inspect rail lines at infrequent intervals. Increases in the frequency and accuracy of track measurements are desirable since they may lead to improved railway safety and a decrease in the risk of derailment.

SUMMARY OF THE INVENTION

The present invention relates generally to measurement systems. More particularly, the present invention relates to methods and systems for performing location measurements using RFID tags. In a particular implementation, a rail trolley is equipped with an RFID positioning system to facilitate determining track gauge and tilt as a function of position (i.e., the rail profile). However, the present invention has broader applicability and can be applied to other location measurement applications including surveying.

According to an embodiment of the present invention, a method of determining a gauge and a tilt of a rail track at a location is provided. The method includes providing a rail trolley including a processor, a memory coupled to the processor, an RFID reader, a gauge sensor, and a tilt sensor and positioning the rail trolley on the rail track at the location. The method also includes interrogating one or more RFID tags positioned along the rail track and determining, using the processor, a fixed location associated with each of the one or more RFID tags. The method further includes determining, using the processor, the location of the rail trolley in relation to the fixed locations associated with each of the one or more RFID tags and determining the gauge and tilt of the rail track at the location of the rail trolley.

According to another embodiment of the present invention, a rail trolley is provided. The rail trolley includes a mechanical platform, a processor mechanically coupled to the mechanical platform, and a memory coupled to the processor. The rail trolley also includes an RFID positioning system mechanically coupled to the mechanical platform and a distance measurement system mechanically coupled to the mechanical platform. The rail trolley further includes a gauge sensor mechanically coupled to the mechanical platform and a tilt sensor mechanically coupled to the mechanical platform.

According to a specific embodiment of the present invention, a method of determining a position of an RFID device is provided. The method includes providing a processor and providing a communications module coupled to the processor. The method also includes transmitting, an information request from the communications module to the RFID device, receiving, at the communications module, reference data from the RFID device, and determining, using the processor, a position of the RFID device using the reference data.

According to another specific embodiment of the present invention, a system for position analysis is provided. The system includes a processor, a memory coupled to the processor, and a communications module coupled to the processor and operable to communicate with an RFID device. The system also includes a position determination module coupled to the memory and operable to determine, using reference data stored in the RFID device, a position of the RFID device.

According to a alternative embodiment of the present invention, a method of determining a position of an object is provided. The method includes providing a processor, and providing a communications module coupled to the processor. The method also includes transmitting an RF interrogation signal from the communications module to an RFID tag, receiving, at the communications module, an RF response signal from the RFID tag, and determining a position associated with the RFID tag using the RF response signal. The method further includes detecting a presence of the RFID tag in a vicinity of the object and computing a position of the object using the position associated with the RFID tag.

According to another specific embodiment of the present invention, a position determination system is provided. The position determination system includes a processor and a memory coupled to the processor. The position determination system also includes an RFID reader coupled to the processor and operable to transmit signals to and receive signals from an RFID tag and a system operable to detect a presence of the RFID tag in a vicinity of the position determination system.

Numerous benefits are achieved using the present invention over conventional techniques. For example, in an embodiment according to the present invention, RFID technology is used in combination with photogrammetry, laser technology, or an electronic distance measurement technology to determine a location of a rail trolley. Embodiments of the present invention can measure the distance from a rail trolley to a known location of a structure associated with a railway (e.g., a pile that supports a catenary), which has accurate survey coordinates to determine a location of the trolley as a function of time. As described throughout the present specification, a passive RFID tag can include the survey coordinates in memory for use in determining the coordinates of the rail trolley on the track. Another benefit provided by embodiments of the present invention is the ease of saving and retrieving information from RFID tags in comparison with conventional technologies. In some implementations, RFID tags can be installed along the rail line during construction, with the surveying team storing location information in the RFID tags during construction or at a later time. Moreover, embodiments of the present invention provide location information that can be easily read and used by general railway maintenance teams.

From the application perspective, by utilizing RFID tags in a rail trolley environment, embodiments of the present invention provide productivity improvements in relation to conventional techniques. In some embodiments, the trolley is able to concurrently read data stored in the RFID tags such as coordinates or other information and also to store or record new information in the RFID tags. Because the trolley can effectively record data in real time, such as the parameters utilized to repair the track, this data can then be available for use by equipment repairing the track, which can read the data stored in the RFID tags by the rail trolley. Thus, embodiments of the present invention provide time savings in comparison with conventional techniques in which the trolley measures the track, storing the parameters in a field computer, followed by analysis of the data and calculation of the parameters, and storing of the data in a file, which is then imported into the repair equipment before starting repairs. In some embodiments, time savings is produced since the computer included with the rail trolley stores the "theoretical" parameters of the track and is able to compare data from the sensors in real time with these parameters and calculate the data used to repair the track and store this information in the RFID tags for future use by the repair equipment. In some implementations, communications options are provided to enable operator review of data as part of the collection and storage processes. These and other benefits have been described throughout the present specification and more particularly below. Various additional objects, features and advantages of the present invention can be more fully appreciated with reference to the detailed description and accompanying drawings that follow.

DETAILED DESCRIPTION OF THE INVENTION

Although track measurement trolleys can provide information on the gauge and tilt of the track, they are limited in their ability to provide absolute coordinates for the position of the trolley as a function of position along the track. Typically, the trolley will be baselined in a train station and the relative position of the trolley will be measured using a wheel or rotation of the trolley's wheels to measure the mileage accumulated by the trolley as it moves along the track. Slippage of the wheel results in errors in the measurement of the position of the trolley, which can accumulate as the trolley moves farther and farther from the station.

In order to provide for increased resolution in measuring the position of the trolley as a function of time as it moves down the rail line, a GPS system can be included as equipment on the trolley, enabling accurate position measurement in many conditions. However, GPS systems are typically expensive and fragile. Additionally, when passing through tunnels or other areas in which GPS signals are obstructed, GPS position data will not be readily available, resulting in uncertainty in the position of the trolley.

Embodiments of the present invention are applicable to both GPS-based coordinate systems as well as other coordinate systems including linear coordinate systems utilized in railway applications, which may be referenced, for example, to a location of a train station or other distance traveled with respect to a known point along the track. As an example, the position of the trolley can be referenced to a distance along the track from the upcoming or previous station.

According to embodiments of the present invention, RFID tags, also referred to as RFID devices, are placed at a number of locations along the track for use in determining the position of the trolley (e.g., as a function of time) as it moves along the rail line. RFID tags generally include an integrated circuit for storing and processing information, modulating and demodulating a radio-frequency (RF) signal, and other specialized functions. The RFID tag thus provides both processing and memory functions. The RFID tag also includes an antenna for receiving and transmitting RF signals between the tag and a reader. The RFID tags can be placed on fixed structures that have been surveyed and the location of the RFID tag (or reference information related to the location of predetermined portions of the fixed structure and/or the RFID tag) is stored in the memory of the RFID tag.

Figure 1:
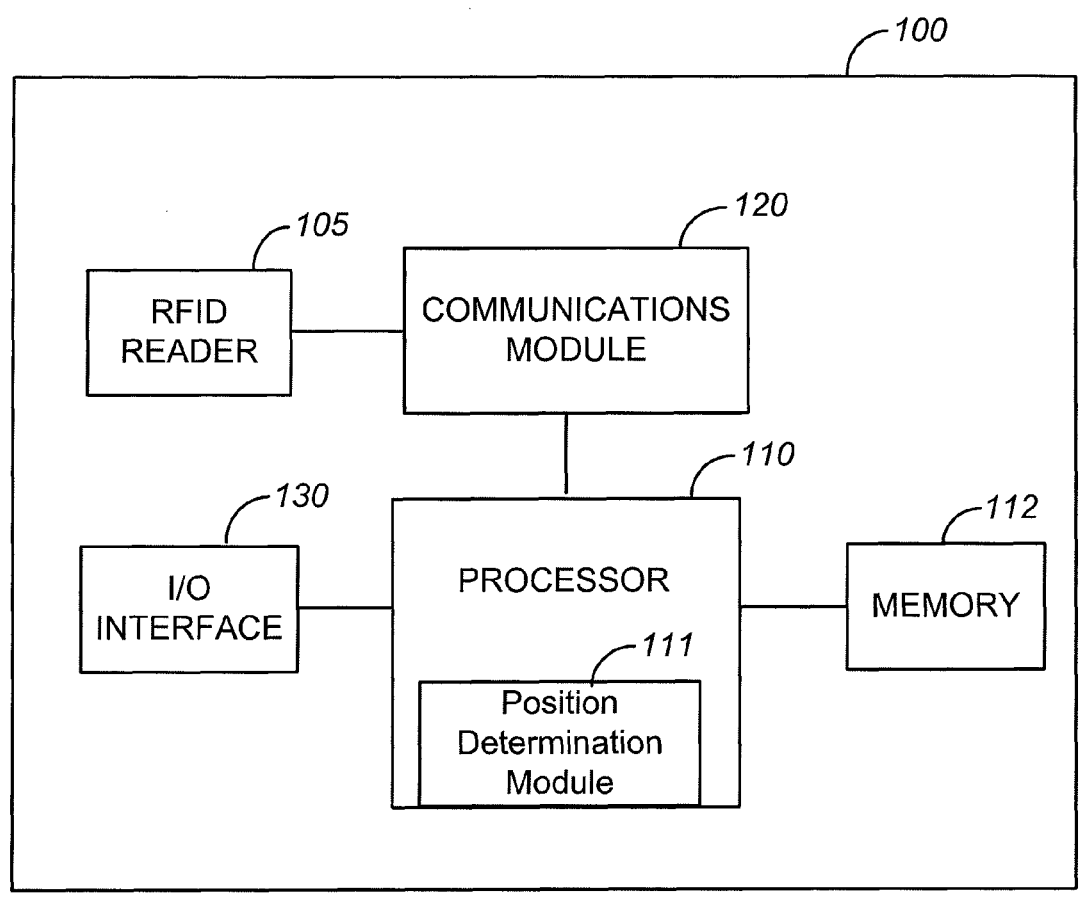
FIG. 1 is a simplified block diagram illustrating an RFID positioning system according to an embodiment of the present invention.

FIG. 1 is a simplified block diagram illustrating an RFID positioning system according to an embodiment of the present invention. The RFID positioning system 100 includes an RFID reader 105 that is operable to interact with RFID tags using an interrogation signal. The RFID positioning system 100 also includes a communications module 120, which can be integrated with the RFID reader 105 in some embodiments and used to transmit the interrogation signals in other embodiments. A processor 110 and memory 112 are included in the RFID positioning system. Processor 110 can process and output RFID data collected by the RFID reader 105 as well as data received from other sources through communications module 120. The processor can include a position determination module 111. In other embodiments, the position determination module 111 can be implemented as a component of the RFID reader 105. According to embodiments of the present invention, the processor 110 can be any type of processor such as a microprocessor, field programmable gate array (FPGA) and/or application specific integrated circuit (ASIC). In other embodiments, the processor 110 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 110 executes instructions and includes that portion of the RFID positioning system 100 that controls the operation of the entire system. Although not depicted in FIG. 1, the processor 110 typically includes a control unit that organizes data and program storage in memory and transfers data and other information between the various parts of the system. The processor 110 is operable to receive input data from the various system components, read and stores code and data in memory 112, and present data to and receive data from the I/O interface 130.

Although the RFID positioning system 100 is shown to contain only a single processor 110 and a single memory 112, the disclosed embodiment applies equally to systems that may have multiple processors and multiple memories with some or all performing different functions in different ways.

Data received and/or processed by the processor 110 can be stored by memory 112, which represents one or more mechanisms for storing data. The memory 112 may include read-only memory (ROM), random access memory (RAM), magnetic disk storage media, optical storage media, flash memory devices, and/or other machine-readable media. In other embodiments, any appropriate type of storage device may be used. Although only one memory 112 is shown, multiple storage devices and multiple types of storage devices may be present.

The memory 112 includes a controller (not shown in FIG. 1) and data items. The controller includes instructions capable of being executed on the processor 110 to carry out the methods described more fully throughout the present specification. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the memory 112 may also contain additional software and data (not shown), which is not necessary to understand the invention. Data received and processed by the processor can be displayed using input/output interface 130, which may include a user interface for receiving and displaying data, images, and the like.

Figure 2:
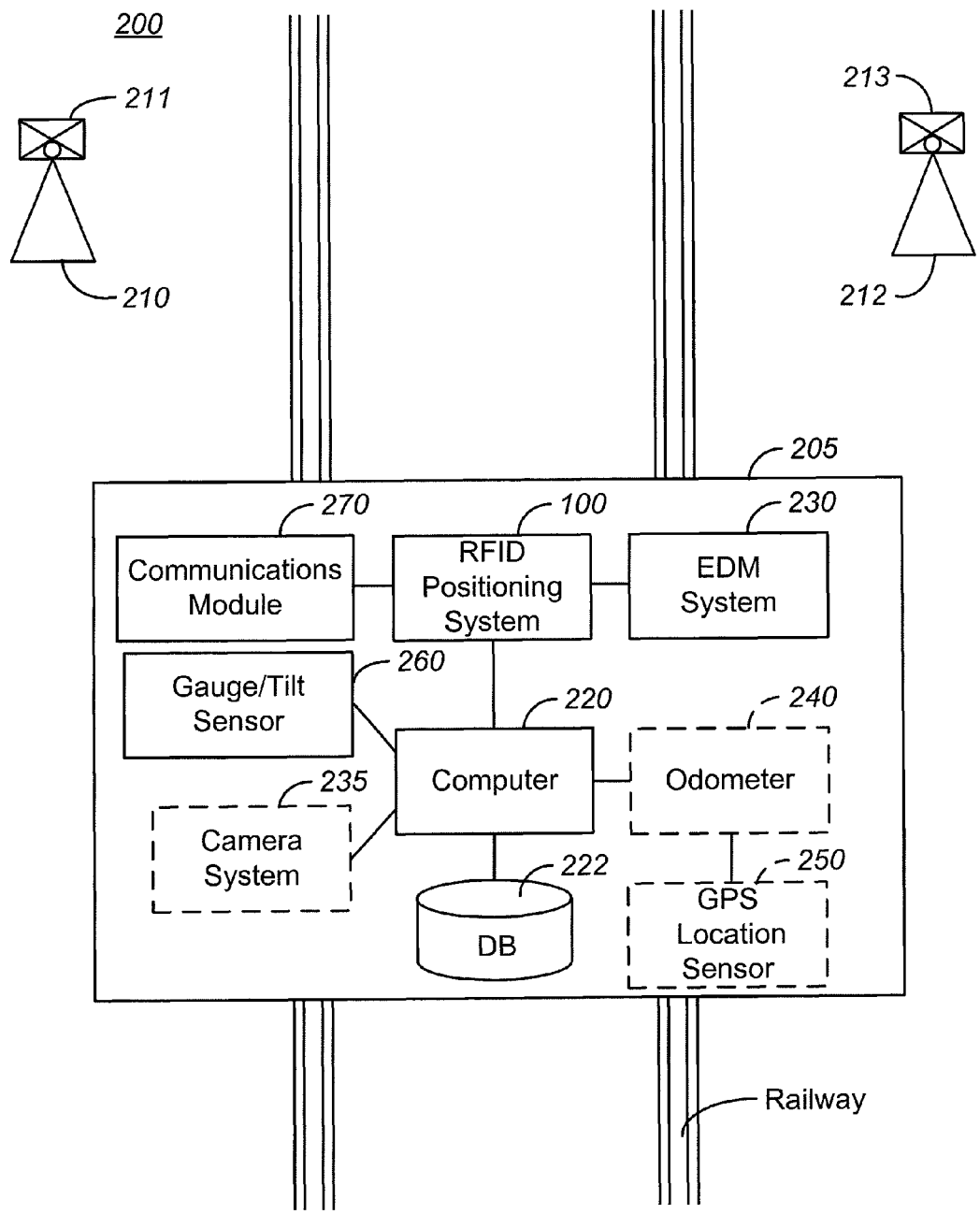
FIG. 2 is a simplified schematic diagram illustrating a railway track geometry measurement system according to an embodiment of the present invention.

FIG. 2 is a simplified schematic diagram illustrating a railway track geometry measurement system according to an embodiment of the present invention. The track geometry measurement system 200 includes a trolley 205 mounted on a railway. The trolley 205, which may also be referred to as a rail trolley, includes mechanical elements (not shown) operable to move the trolley along the railway. Although trolley 205 is illustrated in the context of railway applications, embodiments of the present invention are not limited to railway applications and other applications in which positions of objects are measured are included within the scope of the present invention. The trolley 205 also includes an RFID positioning system 100 described in relation to FIG. 1, a computer 220 and a database 222. Functionality provided by processor 110 and memory 112 can be performed by the computer 220 and database 222 or these functions can be shared. One of ordinary skill in the art would recognize many variations, modifications, and alternatives.

The RFID positioning system 100 is operable to transmit and receive RF signals to and from RFID devices (also referred to as RFID tags) 211 and 213, which are mounted on fixed structures 210 and 212. In an embodiment, a plurality of RFID devices are mounted along the track at a number of locations. Data stored in the RFID tag can include a location of the RFID tag or other information (which may be referred to as reference data), which can then be used to determine the position of the trolley 205 on the railway track in relation to the RFID tag or the fixed structure. Thus, the location of the trolley can be calculated given the location of the RFID tag and the distance from the RFID tag (for example, in three dimensions) to the trolley. As an example, the RFID tags 211 and 213 can be mounted on catenaries associated with the rail line, which can be represented by fixed structures 210 and 212. In some embodiments, the RFID tag includes information on the location of the RFID tag or an associated structure in a latitude/longitude coordinate system although the present invention is not limited to this particular coordinate system and other coordinate systems can be utilized, for example, a rail-centric coordinate system referenced to a station, other physical structure, or location.

Using embodiments of the present invention, it is possible to accurately compute the position of a predetermined point on the trolley as a function of time as it moves along the track. The position of the trolley can be referenced to other locations, such as a station, providing information that the trolley is a predetermined distance, for example 1000 meters, 500 meters, or the like, from the station. In other embodiments, the track geometry is referenced to fixed structures (e.g., the catenaries) or locations along the track.

In some embodiments, the RFID tag includes the location of the RFID tag, for example, a GPS location of the RFID tag. In other embodiments, the RFID tag includes the location of a retro-reflector or other optical device adjacent the RFID tag and/or the distance between the RFID tag and a structure. As an example, a retro-reflector or other optical target could be mounted at a position on the catenary adjacent the RFID tag (i.e., 1 meter due East of the RFID tag or 1 meter directly below the RFID tag). The location of the RFID tag would be read, the distance from the trolley to the retro-reflector would then be measured, and the location of the trolley computed based on the location of the retro-reflector, the 1 meter separation between the retro-reflector and the RFID tag, and the distance from the point of interest on the trolley to the retroreflector. In other implementations, combinations of these examples of location information data is stored in the RFID tag. As an example, the RFID tag could include the location of a retro-reflector associated with the RFID tag (e.g., a single unit including the RFID tag and the retro-reflector). Thus, embodiments of the present invention provide an RFID tag system that can provide a GPS coordinate for a fixed object such as a catenary, another location coordinate based on another coordinate system, for example, a rail-centric coordinate system, or the like. It should be noted that the RFID tag and the optical target or other fixed point do not need to be coincident, collinear, or the like (although they are in some embodiments), but can have various different spatial relationships to each other. In some embodiments, a fixed structure utilized for mounting of an RFID tag can be a structure associated with a railroad catenary, such as a structure or piling carrying the railroad catenary.

In yet other embodiments, the RFID tag includes the position of a point on the fixed object, which has been measured using a surveying system such as a Total Station, available from the present assignee. The RFID tag can also include other identifying information such as a serial number of the fixed object, or the like. Thus, the retro-reflector could be mounted on the RFID tag, and as the trolley passes by, a laser can be used to perform laser range-finding to the retro-reflector for this case in which the RFID tag and the retro-reflector are coincident. Alternatively, the RFID tag can be separated from the retro-reflector with a predetermined spatial relationship between the two items. In this case, the RFID tag includes information about the location of the retro-reflector, the RFID tag, the relationship between them, combinations thereof, or the like.

Several technologies can be use to measure the distance between the RFID tags and the trolley 205. As an example, FIG. 2 illustrates an electronic distance measurement (EDM) system 230 that can utilize lasers or other electrical or optical signals to precisely measure the distance from the RFID tag to the trolley. In other embodiments, photogrammetry is used to measure the position of the trolley with respect to the position of the RFID tag or point on a fixed object with which the RFID tag is associated. Thus, multiple kinds of distance measurement systems are included within the scope of the present invention. Additionally, time of flight for the RFID signal can be used. Embodiments of the present invention are not limited to these distance measurement techniques, but can utilize others depending on the particular implementation. Thus, the EDM system 230 is provided merely by way of example. In some embodiments, optional elements including an odometer 240 or a GPS system 250 are included to provide additional inputs for the location determination process. The GPS system can also be referred to as a GPS location sensor since it is operable to determine a location of trolley 205. The GPS system 250 can be used to provide additional data for the location of the trolley for use in computing a blended least-squares solution or other blended computation using the available location data. One of ordinary skill in the art would recognize many variations, modifications, and alternatives.

Although a railway-based position measurement system using RFID signals is illustrated in FIG. 2, embodiments of the present invention are not limited to this particular application and other position measurement applications are included within the scope of the present invention as discussed more fully throughout the present specification and more particularly below.

Figure 4:
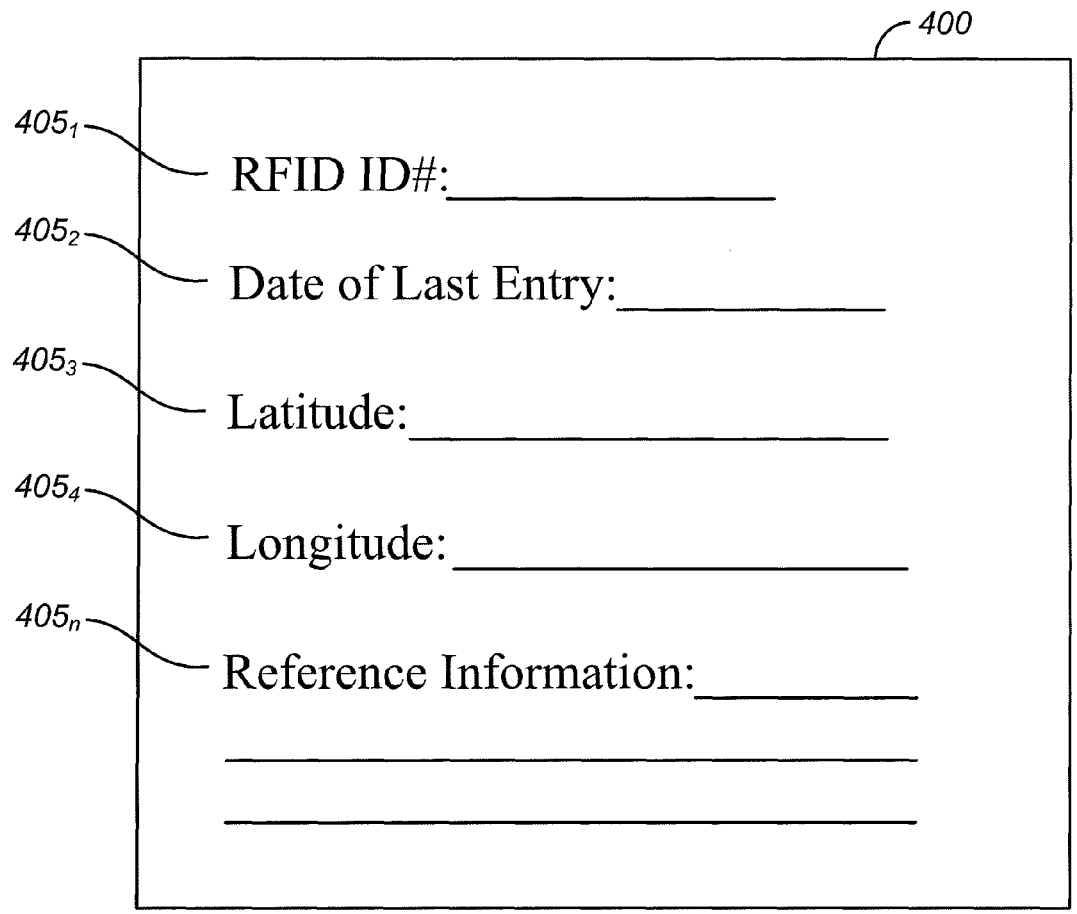
FIG. 4 is a simplified graphical representation of location data stored in the RFID tag according to an embodiment of the present invention.

Embodiments of the present invention utilize the RFID tags by storing information in the RFID tag that can be read at a distance. As an example, the RFID tag can include information about the coordinates of its location. FIG. 4 is a simplified graphical representation of location data stored in the RFID tag according to an embodiment of the present invention. As illustrated in FIG. 4, a variety of data can be encoded in the RFID tag, which is associated with a position of interest according to one or more embodiments of the present invention. Data encoded in the RFID tag 211/213 is graphically shown as data element 400 in FIG. 4. Data element 400 may include a plurality of fields associated with a position of interest. In one embodiment, data element 400 may be encoded in an RFID tag to include an identification number $405_1$, date of last entry $405_2$, latitude coordinate $405_3$, longitude coordinate $405_4$ and reference information $405_n$. RFID identification number $405_1$ may relate to an identification number assigned by a surveying tool. However, it may also be appreciated that identification number $405_1$ may correlate to a predefined identifier, such as a government issued benchmark number.

The date of last entry field $405_2$ may relate to a time and/or date that the data is encoded in the RFID tag. Latitude and longitude elements $405_3$ and $405_4$ may relate to a global position data as determined by a surveying tool or may be referenced to another coordinate system. Alternatively, latitude and longitude elements $405_3$ and $405_4$ may be received from a global positioning system (GPS) receiver.

Reference information field $405_n$ can be used for entering data by a user of the system related to the position of interest. For example, the location of a utility service in the vicinity of a surveying mark may be indicated. Further the reference information field $405_n$ can be a user provided description for the position of interest. According to another embodiment, reference information field $405_n$ may contain information regarding the absolute and/or relative position of other positions of interest, relative to the position of interest, such as a separation between the RFID tag and one or more optical targets. For example, reference information field $405_n$ could contain position data of the next fixed object along the rail line. In that fashion, the location of positions of interest may be facilitated and the time required to locate points of interest may be reduced. Data element 400 has been described in FIG. 4 as having a plurality of data elements (e.g., up to n elements), however, it may be appreciated that a single field may be encoded into the RFID tag. Additionally, other information can be stored in the RFID tag and such information is not limited to the information illustrated in FIG. 4.

Since the RFID tag can be read, for example, at a distance of 100 meters, a new reference point is provided. In some embodiments, additional location information is available from systems on the trolley, for example, the optional GPS system 250, which can be used as a target and compared to or supplemented with the location information provided by the RFID tag.

Other embodiments that utilize time of flight measurements from the RFID tag can provide a reference point based on radio location techniques. As an example, an estimate of the distance from the RFID tag to the trolley can be computed based on time of flight measurements.

In some embodiments, the trolley 205 is able to not only read data stored in the RFID tag, but also to store data in the RFID tag. Thus, some embodiments enable two way communications with the RFID tags in both a data reading and a data storage mode. As described above, the data stored in the RFID tag can be based on data read from the RFID tag in combination with data received from sensors or other sources. The I/O interface 130 illustrated in FIG. 1 can be used to store data in the RFID tags. Alternatively, the RFID reader 105 can be provided with both read/write functionality. One of ordinary skill in the art would recognize many variations, modifications, and alternatives.

Referring to FIG. 2, the trolley 205 also includes a gauge/tilt (G/T) sensor 260 that provides the distance between the tracks (gauge) and the elevation difference (tilt) between the rails, which may be referenced to baseline values. In non-railway implementations, the G/T sensor 260 is optional. In some embodiments, conventional rail trolleys such as the Track Geometry Recording Trolley TEC-1435, available from Esveld Consulting Services of Zaltbommel, The Netherlands, can be modified to implement embodiments of the present invention. Alternatively, embodiments of the present invention can be implemented based on the Trimble® GEDO CE Trolley System available from the present assignee. Other measurements in addition to gauge and tilt can be made, with the locations of each of the measurements being referenced to the various measurements utilizing the RFID-based location determination techniques described herein.

Thus, embodiments of the present invention provide improved system performance in comparison with conventional rail measurement systems by providing information on the location of various track measurements in an economical and accurate manner. As will be evident to one of skill in the art, the location-referenced measurements can then be used in performing track maintenance, record keeping, and ensuring track safety. In some embodiments, a database is populated as the trolley moves along the track, storing the various measurements and their locations for use in real-time or subsequently.

As the trolley moves between the fixed objects including RFID tags (e.g., between catenaries separated by a distance of 60 meters), interpolation can be performed to determine the location of the track elements between the fixed objects. In another implementation, RFID tags are integrated with optical targets mounted at locations adjacent the track (e.g., on railroad ties) at shorter distances than the separation between the fixed objects with known positions.

Referring to FIG. 2, the trolley can also include a communications module 270 to enable communication of data collected by the trolley to a remote site, for example, a remote computer, track maintenance equipment, or the like. In other embodiments, the location-referenced data is processed by computer 220 and stored in database 222, which may be integrated with computer 220. As an example, a tablet PC can be used as computer 220 to store and process the data, which can then be downloaded and formatted as appropriate for use by track maintenance equipment.

As described above, the location of the trolley is determined using data from the RFID tags as well as photogrammetric methods in some embodiments to measure distances from an optical target associated with a particular RFID tag to the trolley. Referring to FIG. 2, an optional camera system 235 is illustrated and can be used to capture images used to perform photogrammetric methods. The use of optical systems to capture data associated with an image opens up opportunities for systems with power and flexibility in performing calculations of the distance from the trolley (typically moving) to the optical target. In photogrammetry, a series of images are captured at various positions and then processed to determine the location of the trolley referenced to various objects in the various images in the series, which can be the fixed objects 210 and 212. Thus, embodiments of the present invention utilize a series of images including a fixed object, the location of which is determined by RFID tag interrogation.

In yet other embodiments, a surveying process is implemented to determine the locations of the fixed objects along the rail line or other region/structure to be measured. The locations of the fixed objects determined during the surveying process can be stored in a database. In this implementation, it is not necessary to store the locations in the various RFID tags, although RFID tags can be utilized in making the initial measurements. During track measurements, the database can be utilized in conjunction with photogrammetric methods to determine the position of the trolley during measurements. Merely by way of example, multiple optical targets can be associated with a single RFID tag. One or more images including the multiple targets with a known spacing between them (e.g., stored in the associated RFID tag) can be analyzed to calibrate the image(s) and determine the distance from the set of targets to the trolley. As another example, data from the RFID tag and an optical target associated with the RFID tag could be supplemented using GPS data from GPS system 250 to provide another reference point.

In some embodiments, a technique referred to as Simultaneous Location And Mapping (SLAM) is utilized to determine the position of the trolley between position measurements made using RFID tags. As described below, SLAM is a technique that collects multiple images (e.g., from a video stream) and then, using numerous points in the images, the location of the camera system as a function of time can be determined with high accuracy in a variety of environments.

Figure 3:
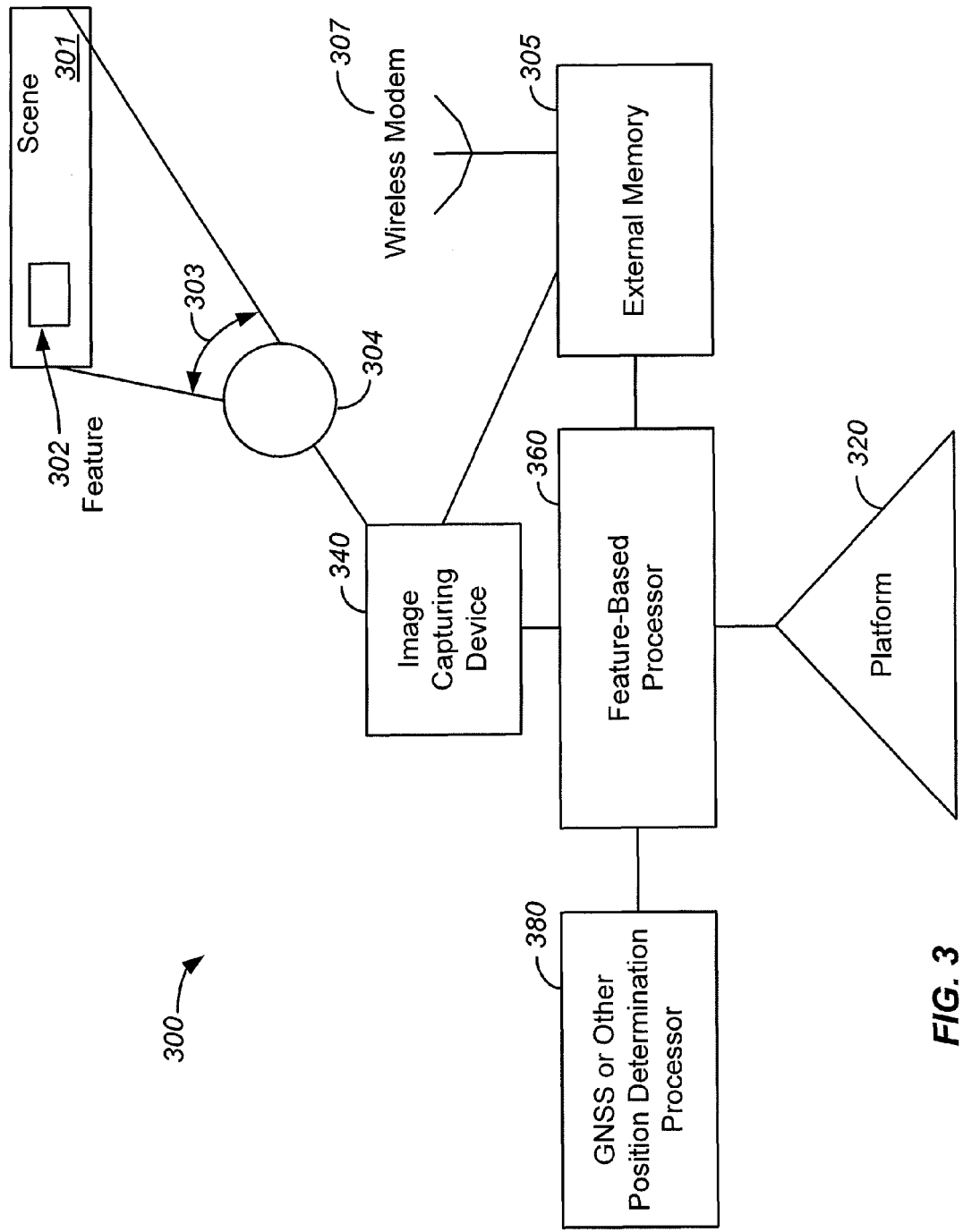
FIG. 3 is a schematic diagram illustrating an image-based positioning apparatus according to an embodiment of the present invention.

FIG. 3 is a schematic diagram illustrating an image-based positioning apparatus according to an embodiment of the present invention. The image-based positioning apparatus 300 includes an image-capturing device 340 configured to capture at least one image including at least one feature. An image is illustrated as scene 301 with feature 302. The image-based positioning apparatus also includes a position determination processor 380, and a feature-based processor 360 configured to process the at least one image to lock on and to track a location of at least one captured feature. The image-based positioning apparatus further includes an external memory 305 coupled to the feature-based processor 360 and a wireless modem 307 coupled to the memory 305. In some embodiments, one or more system elements are optional as appropriate to the particular application.

In an embodiment of the present invention, the image-capturing device 340 can be a digital camera; a digital video camera; a digital camcorder; a stereo digital camera; a stereo video camera; a motion picture camera; a depth camera; a television camera, systems including combinations thereof, or the like.

Referring to FIG. 3, in an embodiment of the present invention, if satellite signals are unavailable or compromised, coordinates of a reference (a first) position of the image-capturing device 340 (or a platform 320) is determined by a feature-based processor such as a SLAM processor, a Match-Move processor, a photogrammetric processor, or the like. In an embodiment of the present invention, the feature-based processor 360 is implemented by a SLAM processor. The SLAM processor uses sequences of images from one or more video cameras to identify fixed features and then builds a map of these fixed features. Two key image processing techniques are applied.

The first image processing techniques applied in the SLAM method is image segmentation and feature extraction. SLAM uses this to identify particular features that are known to be stationary and hence valid reference points in three dimensional (3D) space. Typical choices are objects with reasonably well-defined features, often corners, in an outdoor setting or wall-mounted fixtures of various kinds (lights, switches, window ledges or corners) in an indoor setting. In some embodiments, features associated with a railway are utilized such as catenaries, bridges, overpasses, or the like in conjunction with the SLAM techniques.

The second image processing techniques applied in the SLAM method is the method of stereo imaging used to extract depth and hence range-to-feature information. SLAM builds a map of the features in a three dimensional (3D) coordinate grid as it images them from different robot positions, and thereby determines its own position in that grid. The mapping and self-location process is implemented in a single Kalman filter that estimates all variables. Once SLAM has identified reference points via feature extraction, SLAM has originally used simple laser ranging but has been generalized to use video instead. In this case range extraction is done by using stereo imaging from multiple overlapping two dimensional (2D) images.

The SLAM method employs optics 304 that provide a Field Of View (FOV) 303. The FOV 303 can be narrow, which is a less expensive approach but can limit the utility of the instrument since the operator will typically manually select features and aim the camera at them. A wide FOV can be used to enable the camera to capture features automatically, but utilizes a fine resolution and hence a large CCD array to obtain a centimeter-level pixel resolution. The instrument would include a SLAM processing algorithm that inputs images at a frame rate dictated by the instrument dynamics (5 frames per second may be adequate for a hand-held instrument) and outputs the positions of the fixed targets it has identified and the instrument position all in a relative Cartesian coordinate frame whose x-y axis is determined by the initial orientation of the instrument. For further reference, please see: (i) Thomas Lemaire, Cyrille Berger, Il-Kyun Jung and Simon Lacroix, "*Vision-Based SLAM: Stereo and Monocular Approaches*," International Journal of Computer Vision 74(3), 343-364, 2007; and (ii) Moritz Köhler, Shwetak N. Patel, Jay W. Summet, Erich P. Stuntebeck, and Gregory D.

Abowd, Institute for Pervasive Computing, Department of Computer Science ETH Zurich, 8092 Zurich, Switzerland, "*TrackSense: Infrastructure Free Precise Indoor Positioning Using Projected Patterns.*"

As described above, the SLAM technique uses sequences of images from one or more still or video cameras to identify fixed features and then builds a map of these fixed features and the trolley's location among them. Once SLAM has identified reference points via feature extraction, the method of positioning is similar to the previously described positioning method using laser ranges. In this case range extraction is done using stereo imaging from multiple overlapping 2D images.

SLAM techniques can be used in place of or in addition to the EDM in a GIE survey instrument. The instrument may include a video camera with sufficiently small pixel size on the order of less than 2 cm via either a large CCD or a narrow field of view (FOV). A Kalman filter can use the SLAM position information in addition to inertial, GPS and zero velocity data to compute the optimal position and to update the SLAM processor's estimates of fixed target positions. If the GIE survey instrument is operated in full RTK mode outside of a precise-GPS-denied zone, then all target position errors can be reduced to 1-2 cm. When the GIE survey instrument enters a precise-GPS-denied zone, then SLAM plus AINS orientation data provides the position information to maintain RTK position accuracy.

The SLAM image segmentation and feature extraction algorithm can be designed for a particular feature such as an unusual shape and/or color, selected to make segmentation and extraction simple and reliable. The operator may deploy tripods carrying this feature in place of the retro-reflectors described previously. This would ensure that the desired features for SLAM are always present. It would also simplify the SLAM software running in the SLAM processor and possibly the design of the video camera.

In an embodiment of the present invention, the feature-based processor 360 is implemented by using a Match Move processor. The operations of the Match Move processor include several steps. The first step is to identify and to track features.

In an embodiment, a feature is essentially a portion of the image that can be detected by an algorithm. They can be points, or regions, or contours, or abstract areas of texture, or anything else we can imagine. In many of the algorithms discussing herein, there is also the assumption that features can be identified across images (correspondences found), but this is not a part of the definition of a feature. Correspondence finding is an operation performed on features, not a characteristic of them.

In an embodiment, the feature tracking process includes two steps. The first step is to identify the apparent motion of pixels in the images. This results in 2D coordinates in image space, i.e. a "set of tracking data." There are two general methods: (a) finding corresponding features in the images; and (b) gradient-descent optical flow.

The second step involves solving for three-dimensional (3D) motion. This process attempts to derive the motion of the image-capturing device 340 by solving the inverse-projection of the two-dimensional (2D) paths for the position of the image-capturing device 340. In some embodiments, a calibration process is performed. More specifically, when a point on the surface of a three dimensional object is photographed its position in the two-dimensional (2D) frame can be calculated by a three-dimensional (3D) projection function.

One can introduce a notion of an abstract camera. This abstract camera by definition is an abstraction that holds all the parameters necessary to model the image-capturing device 340 in a real or in a virtual world. Thus, an abstract camera is basically a camera vector that includes as its elements the position of the image-capturing device 340, its orientation, focal length, and other possible parameters that define how the image-capturing device 340 focuses light onto the film plane. Exactly how this camera vector is constructed is not important as long as there is a compatible projection function P.

The projection function P takes as its input a camera vector (denoted camera) and another vector the position of a three-dimensional (3D) point in space (denoted xyz) and returns a two-dimensional (2D) point that has been projected onto a plane in front of the camera (denoted XY). We can express this as follows:

$$XY = P(\text{camera}, xyz). \tag{Eq. 1}$$

For example, in case of a feature projection, cameras at frames i and j project the view onto a plane depending on the parameters of the camera. In this way features tracked in two-dimensional (2D) space correspond to real points in a three-dimensional (3D) space.

However, the projection function transforms the three-dimensional (3D) point and strips away the component of depth. Without knowing the depth of the component an inverse projection function P' can only return a set of possible three-dimensional (3D points that form a line emanating from the center of the camera and passing through the projected two-dimensional (2D) point. We can express the inverse projection as:

$$xyz \in P'(\text{camera}, XY). \tag{Eq. 2}$$

or $$\{xyz : P(\text{camera}, xyz) = XY\}. \tag{Eq. 3}$$

In an embodiment, if the features are on the surface of a rigid object such as a building, than the real point xyz will remain at the same place in real space from one frame of the image to the next one:

$$(xyz)_i = (xyz)_j; \tag{Eq. 4}$$

wherein the subscripts i and j refer to arbitrary frames in the shot that is being analyzed. It follows that:

$$P'(\text{camera}_i, XY_i) \cap P'(\text{camera}_j, XY_j) \neq \{\ \} \tag{Eq. 5}$$

Because the value of $XY_i$ has been determined for all frames that the feature is tracked through by the tracking program, one can solve the reverse projection function between any two frames as long as $P'(\text{camera}_i, XY_i) \cap P'(\text{camera}_j, XY_j)$ is a small set. The set of possible camera vectors that solve the equation at i and j (denoted $C_{ij}$).

$$C_{ij} = \{(\text{camera}_i, \text{camera}_j) : P'(\text{camera}_i, XY_i) \cap P'(\text{camera}_j, XY_j) \neq \{\ \}\}; \tag{Eq. 6}$$

It follows from (Eq. 6) that there is a set of camera vector pairs $C_{ij}$ for which the intersection of the inverse projections of two points $XY_i$ and $XY_j$ is a non-empty set centering around a stationary point xyz. It also follows from (Eq. 6), that for any position of the image-capturing device 340 in space, there is a set of corresponding parameters (orientation, focal length, etc) that will photograph a one-point-feature exactly the same way. However, since a set of camera vector pairs $C_{ij}$ has an infinite number of elements, a one-point-feature is not sufficient to determine the actual position of the image-capturing device 340. The more tracking points, the more precisely one can determine an actual position of the image-capturing device 340.

For a set of points $\{(xyz)_{i,0}, \ldots, (xyz)_{i,n}\}$ and $\{(xyz)_{j,0}, \ldots, (xyz)_{j,n}\}$ where i and j still refer to frames and n is an index to one of many tracking points being followed, one can derive a set of camera vector pair sets $\{C_{i,j,0}, \ldots, C_{i,j,n}\}$. Using this approach of multiple tracks one will decrease the number of possible parameters of the camera. The set of possible camera parameters that fit, F, is the intersection of all sets:

$$F = C_{i,j,0} \cap \ldots \cap C_{i,j,n} \qquad \text{(Eq. 7)}$$

The fewer the number of elements in this set F the closer one can come to extracting the actual parameters of the image-capturing device 340. Due to errors introduced to the tracking process, a statistical approach is required to determine a good camera vector for each frame. Optimization algorithms and bundle block adjustment can be utilized to narrow down the possible solutions to the motion of the camera. Additional description related to SLAM systems, match move systems, photogrammetry, and other camera-based location determination systems is found in U.S. patent application Ser. No. 11/303,676, filed on Dec. 15, 2005, U.S. patent application Ser. No. 12/123,973, filed on May 20, 2008, and U.S. patent application Ser. No. 12/566,093, filed Sep. 24, 200, the disclosures of which are hereby incorporated by reference in their entirety for all purposes.

Three-dimensional match moving tools make it possible to extrapolate three-dimensional information from two-dimensional photography. Programs capable of 3D match moving include:
Voodoo (freeware; Scenespector VooCAT;
Icarus (University of Manchester research project, now discontinued);
Maya Live;
The Pixel Farm PFTrack;
PFHoe (Cost-effective match mover based on PFTrack algorithms);
REALVIZ MatchMover (Re-released as part of Maya 2010 bundle);
Science.D. Visions 3DEqualizer (which won an Academy Award for Technical Achievement);
Andersson Technologies SynthEyes; and
Boujou (which won an Emmy award in 2002)

Figure 5:
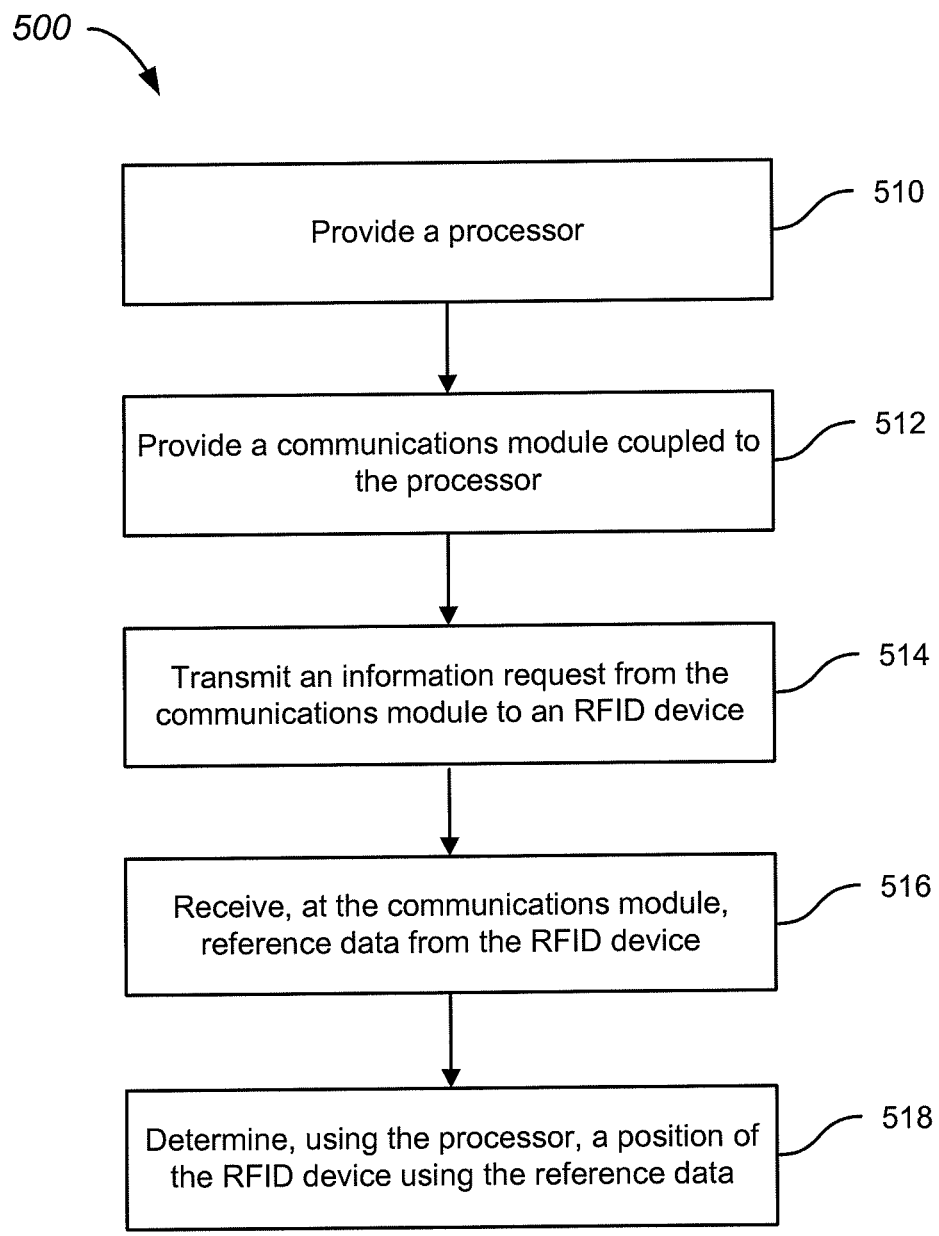
FIG. 5 is a simplified flowchart illustrating a method of determining a position of an RFID device according to an embodiment of the present invention.

FIG. 5 is a simplified flowchart illustrating a method of determining a position of an RFID device according to an embodiment of the present invention. The method 500 includes providing a processor (510) and providing a communications module coupled to the processor (512). The method also includes transmitting an information request (e.g., an RF interrogation signal) from the communications module to an RFID device (514) and receiving, at the communications module, reference data from the RFID device (516). In an embodiment, the RFID device is mounted on a fixed structure such as a railroad catenary, a railroad pile, a physical structure such as a wall running along a rail line, or the like. The reference data can include a GPS coordinate of the RFID device or the location of the RFID device in some other appropriate coordinate system, such as a location coordinate referenced to a railroad station.

The method further includes determining, using the processor, a position of the RFID device using the reference data (518). In the embodiment illustrated in FIG. 5, the reference data enables a computation of the location of the RFID device. In other embodiments, the reference data is used for other purposes including surveying applications as described more fully throughout the present specification.

It should be appreciated that the specific steps illustrated in FIG. 5 provide a particular method of determining a position of an RF device according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6:
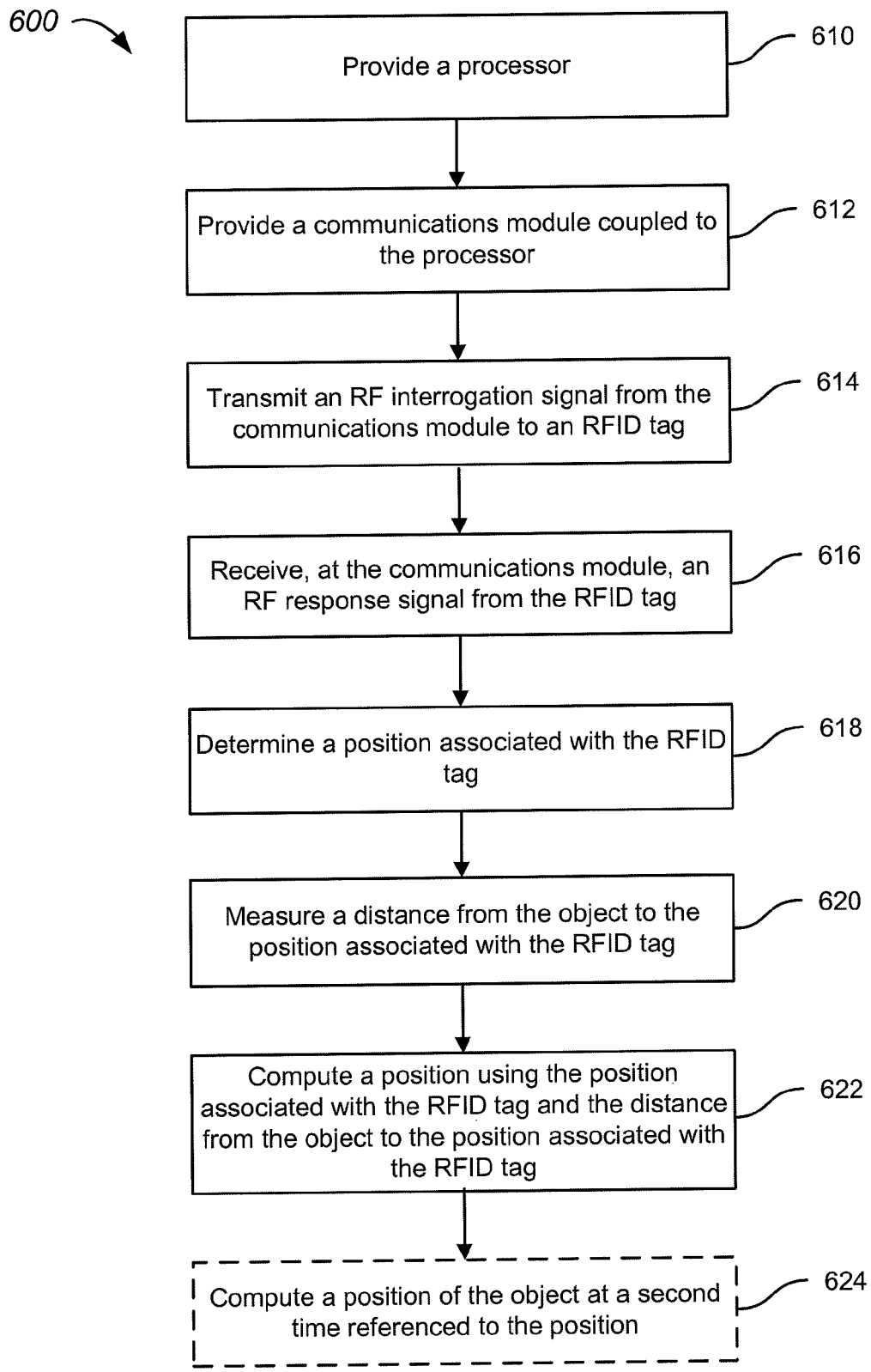
FIG. 6 is a simplified flowchart illustrating a method of determining a position of an object as a function of time according to an embodiment of the present invention.

FIG. 6 is a simplified flowchart illustrating a method of determining a position of an object as a function of time according to an embodiment of the present invention. In some embodiments, the method does not require determining multiple positions as a function of time, but can be used to determine a position at a single time. The method 600 includes providing a processor (610) and providing a communications module coupled to the processor (612). The method also includes transmitting an RF interrogation signal from the communications module to an RFID tag (614) and receiving, at the communications module, an RF response signal from the RFID tag (616). The RFID tag can be mounted on a structure associated with a rail line, such as a catenary or a structure associated with a catenary.

The method further includes determining a position associated with the RFID tag using the RF response signal (618) and may include measuring a distance from the object to the position associated with the RFID tag (620). The RF response signal can include data associated with a GPS location associated with the RFID tag as well as other data as illustrated in FIG. 4. The GPS location associated with the RFID tag can be a location of an optical target associated with the RFID tag, for example, mounted a predetermined distance from or coincident with the RFID tag.

In some embodiments, the measurement of the distance from the object to the position associated with the RFID tag is not utilized. As an example, the presence of the RFID tag could be detected as being in a vicinity of the object. For example, reflected light could be detected, indicating that the object is adjacent a reflector associated with the RFID tag. In another example, the strength of the RF response signal from the RFID tag could be monitored to indicate the proximity of the object to the RFID tag. Other techniques can be used as well. In these embodiments, once the presence of the RFID tag is detected, the position of the object can be computed using the position associated with the RFID tag. As an example, an RFID tag could have two retroreflectors positioned on either side of a rail line. As a rail trolley moves down the track, an RF interrogation signal could be sent out from the object and receive an RF response signal in return. Additionally, an optical signal could be sent out and reflected from the retroreflectors. When the trolley receives the two reflected optical signals, the fact that the trolley is at the location between the retroreflectors and the position data stored in the RFID tag can be used to determine the position of the trolley, as an example.

In other embodiments, a position of the object is measured using the position associated with the RFID tag and the distance from the object to the position associated with the RFID tag (622) and optionally computing, using the processor, a position of the object at a second time (624). The position of the object at the second time is referenced to the position of the object.

In some embodiments, the position of the object at the first time is computed by blending GPS location data for the object with a GPS location associated with the RFID tag. Distance measurements, for example, measurement of the distance from the object to the position associated with the RFID tag can include the use of an EDM system, a photogrammetry system including a camera, a processor, and a memory, or other suitable distance measuring systems.

It should be appreciated that the specific steps illustrated in FIG. 6 provide a particular method of determining a position of an object as a function of time according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
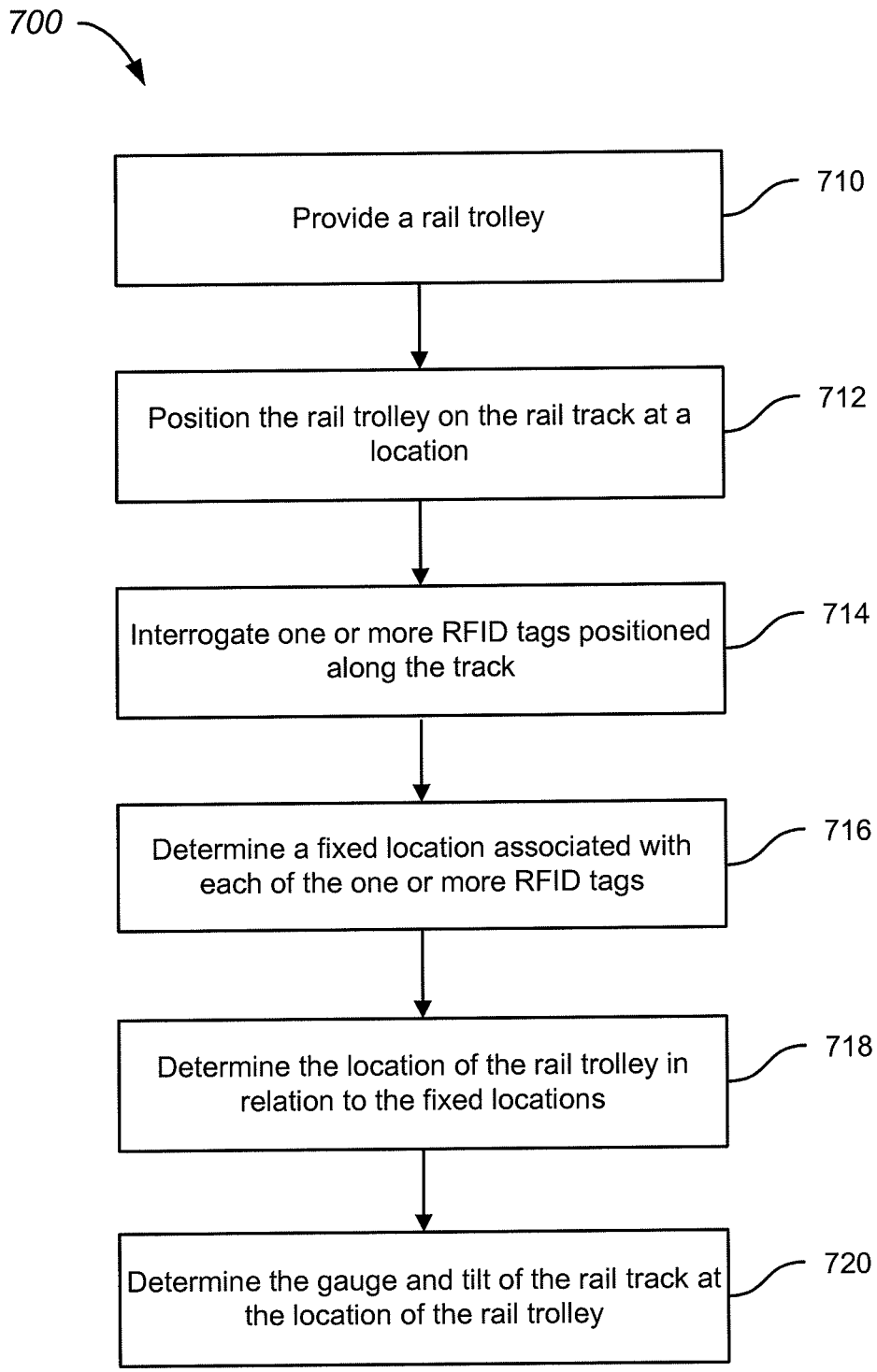
FIG. 7 is a simplified flowchart illustrating a method of determining a gauge and tilt of a rail track at a location according to an embodiment of the present invention.

FIG. 7 is a simplified flowchart illustrating a method of determining a gauge and tilt of a rail track at a location according to an embodiment of the present invention. The method 700 includes providing a rail trolley (710). The rail trolley includes a processor, a memory coupled to the processor, an RFID reader, a gauge sensor, and a tilt sensor. The rail trolley can additionally include other elements including an EDM system or a photogrammetry system used to determining the location of the rail trolley in relation to fixed locations along the rail line. The fixed locations can each be associated with one or more RFID tags. As illustrated in FIG. 2, the rail trolley can include a GPS system, an odometer, a communications module integrated with or separate from the RFID reader, a camera system, or the like. In some embodiments, the camera system can be used with a processor and memory to implement a photogrammetry system as described herein.

The method also includes positioning the rail trolley on the rail track at a location (712) and interrogating one or more RFID tags positioned along the rail track (714). Because the RFID tags can be read at a distance, the RFID tags do not have to be adjacent the track but can be placed at locations separated by a given distance from the track. In other embodiments, the RFID tags are integrated with portions of the track, for example mounted on railroad ties supporting the rails, mounted on catenaries supporting electrical wires for the trains, mounted on bridges or other physical structures, attached to surveyed structures associated with the rail track, or the like. In some embodiments, positioning the rail trolley at the location is accomplished as the rail trolley rolls along the track at a constant or variable speed.

The method further includes determining, using the processor, a fixed location (e.g., a GPS location) associated with each of the one or more RFID tags (716) and determining, using the processor, the location of the rail trolley in relation to the fixed locations associated with each of the one or more RFID tags (718). The method additionally includes determining the gauge and tilt of the rail track at the location (720).

In some embodiments, the method further includes storing the gauge and tilt of the rail track at the location in the memory, positioning the rail trolley on the rail track at a second location, determining, using the processor, the second location of the rail trolley, determining the gauge and tilt of the rail track at the second location, and storing the gauge and tilt of the rail track at the second location in the memory. In these embodiments, the rail trolley is typically rolling along the track and recording information about the track such as gauge and tilt referenced to the position of the trolley, thereby providing location-referenced data useful in analyzing and maintaining the track. The second location of the rail trolley can be referenced to the first location by measuring a distance from the location to the second location.

It should be appreciated that the specific steps illustrated in FIG. 7 provide a particular method of determining a gauge and tilt of a rail track at a location according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

In addition to railway-related surveying applications, embodiments of the present invention are applicable to other surveying operations using RFID-based location determination systems. As an example, in many surveying tasks, reference points are utilized as part of the surveying process. These reference points can be provided on a variety of fixed objects. A surveyor may need to contact a local authority in a given region to determine the location of these reference points and the location information associated with the reference points, for example, the GPS coordinates.

Embodiments of the present invention can utilize RFID tags associated with the reference points to facilitate surveying operations since the operator does not need to obtain independent information about the location of the reference points. As an example, the RFID system can be used to read the coordinates of the reference point and the survey can be performed using this information. In GNSS applications, the RFID tag can be interrogated to obtain the coordinates of the reference point and the GNSS measurements of an object to be surveyed can be obtained sequentially or concurrently to determine the location of the object for the survey. Thus, integration of RFID-based location information with GNSS-based surveying equipment is included within the scope of the present invention. One of ordinary skill in the art would recognize many variations, modifications, and alternatives.

Figure 8:
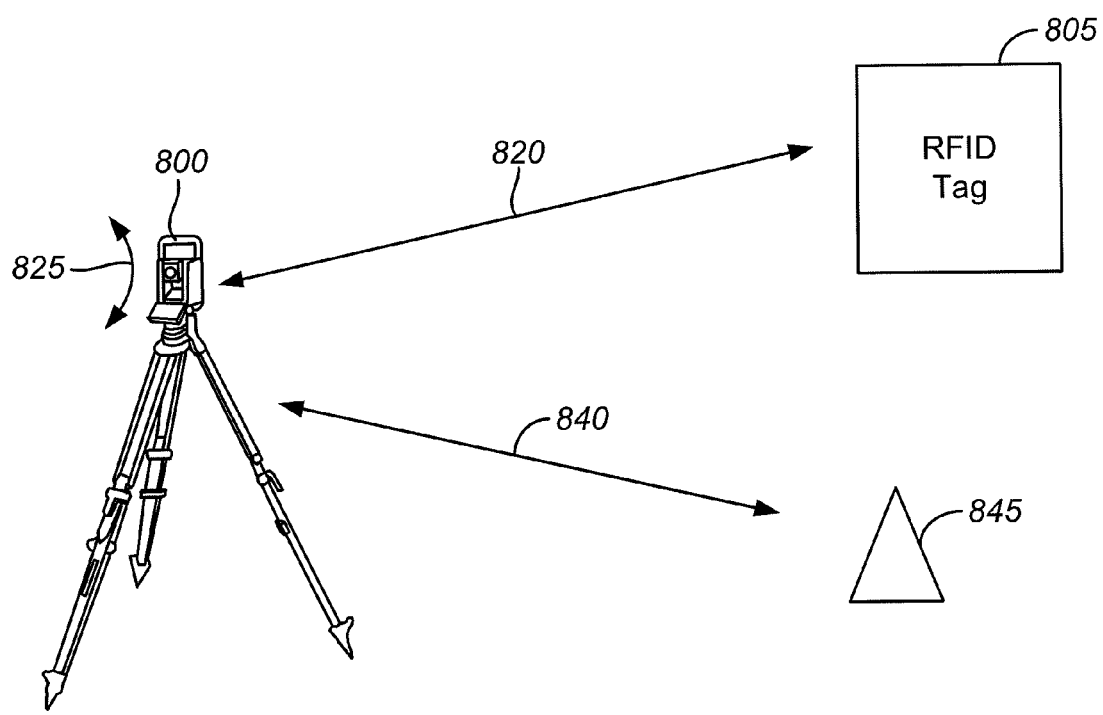
FIG. 8 is a simplified schematic diagram illustrating a surveying system incorporating an RFID tag according to an embodiment of the present invention.

FIG. 8 is a simplified schematic diagram illustrating a surveying system incorporating an RFID tag according to an embodiment of the present invention. As illustrated in FIG. 8, surveying tool 800 may be configured to perform a surveying measurement and/or interrogate an RFID tag 805 associated with a position of interest 845. For example, surveying tool 800 may be configured to determine a distance, shown as 840, to the position of interest 845. Further, surveying tool 800 can determine an angular offset, shown as 825, for the position of interest in relation to surveying tool 800. As shown in FIG. 8, RFID tag 805 is at a distance 820 from the surveying tool 800 and is separated from position of interest 845, but in some embodiments, they may be co-located.

Referring to FIG. 8, the graphical representation of the surveying tool 800 and associated elements provides insight into one or more embodiments of the invention. The surveying tool 800 is shown as a Total Station according to one embodiment. The Total Station may be configured to perform a surveying measurement and/or detect RFID tag 805, which may be associated with a position of interest. It should also be appreciated that RFID tag 805 can include position information, which may be used by surveying tool 800 to decode data. For example, the position information may provide a reference to determine the orientation of the RFID tag 805. As such, surveying tool 800 can provide omni-directional decoding of RFID tags.

The RFID tag 805 may be fixed or attached to either moveable or fixed structures. Data encoded in RFID tag 805 may include an identification and feature information for a structure to which the RFI tag is attached or other items associated with the RFID tag. According to another embodiment of the present invention, surveying tool 800 may be configured to detect an RFID tag from a distance. Data encoded in RFID tag 805 may be decoded by surveying tool 800 to provide an orientation of the surveying tool. As such, surveying tool 800 can then use decoded information to provide directional information to the user of the surveying tool 800.

According to another embodiment, RFID tag 805 can provide a plurality of information types. For example, RFID tag 805 may include an identification number assigned by a surveying tool or a predefined identifier, such as a government issued benchmark number. Similarly, RFID tag 805 can include data such as a date or time relating to a time and/or date that the RFID tag is encoded. The date value can be useful when determining a rate of movement for a position of interest. Latitude and longitude coordinates relating to global position data and/or latitude and longitude coordinates may further be decoded from an RFID tag. Additionally, RFID tag 805 may include feature information including data entered by a user related to the position of interest. For example, the location of a utility service in the vicinity of a surveying mark may be indicated. In addition, information related to a position of interest that the device is required to locate and measure may be stored using the RFID tag.

Surveying tool 800 may include a position detection module configured to determine position data for the position of interest 845. Additionally, surveying tool 800 may further be configured to store data retrieved from RFID tag 805 as well as data decoded from the received data. In one embodiment, the surveying tool is a Total Station available from the present assignee and is configured to determine position data by employing Global Position Satellite (GPS) system data. Additional positioning satellite system data which may be employed includes GLONASS, Galileo, and Compass, the Global Navigation Satellite System (GNSS). Accordingly, surveying tool 800 may include and/or relate to equipment manufactured by the assignee and include products designed for surveying applications and Geographical Information System (GIS) applications. Exemplary equipment which may be employed includes the Trimble™ S6, VX Spatial Station, and the family of GeoExplorers used in GIS applications. Other techniques employing a combination of terrestrial optical survey and satellite-based position determination are also well known in the arts. The following patents are hereby incorporated by reference in their entirety: U.S. Pat. No. 5,471,218; U.S. Pat. No. 5,923,287; and U.S. Pat. No. 6,529,828.

According to yet another embodiment, a device may be provided that is related to a Geographic Information System (GIS) unit, which may be a handheld unit. In that fashion, one or more detected RFID tags may be decoded by the handheld device and the decoded data may be used by one or more applications of the GIS. According to another embodiment of the invention, the handheld device (or surveying tool 800) can transmit detected RFID tag data to a central processor for collection and processing over a communications link (not shown). The communications link may be one of a wired or wireless data link.

Figure 9:
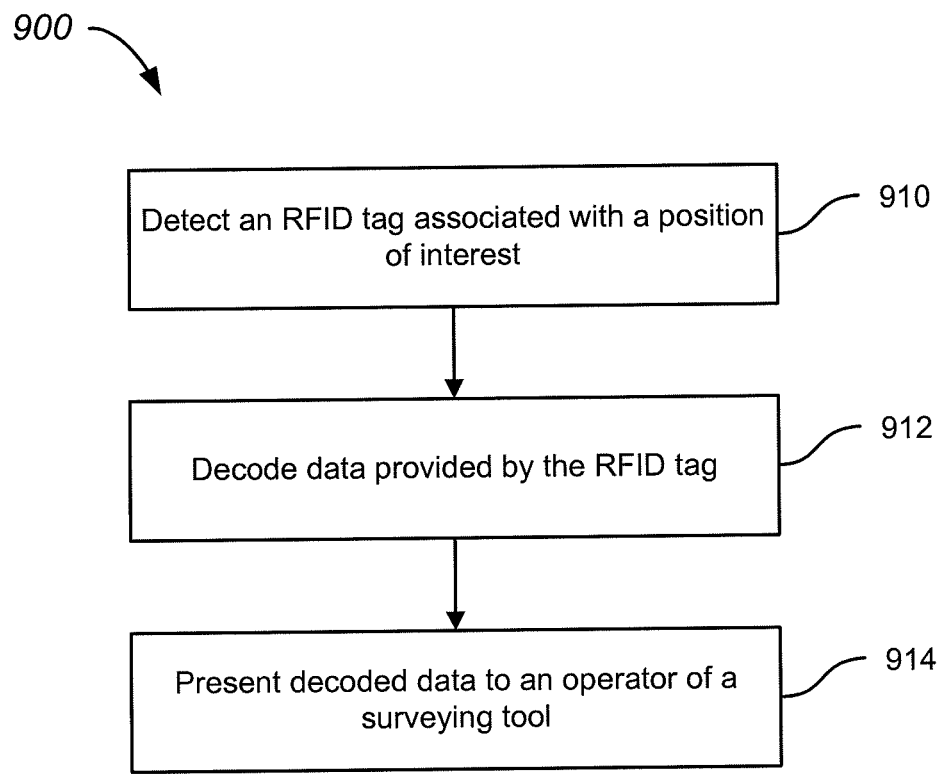
FIG. 9 is a simplified flowchart illustrating a method of presenting data to an operator of a surveying tool according to an embodiment of the present invention.

FIG. 9 is a simplified flowchart illustrating a method of presenting data to an operator of a surveying tool according to an embodiment of the present invention. The method 900 may include a process for associating a position of interest with an RFID tag or device. The method 900 may be initiated by performing a surveying measurement for the position of interest (e.g., position of interest 805 illustrated in FIG. 8), using a surveying tool (e.g., surveying tool 800). Measurement data may be encoded in the RFID tag along with other appropriate data. As an example, the RFID tag may be encoded to store measurement data and/or user provided data as described below with more detail with respect to FIG. 4. The method may further include attaching the RFID tag to or mounting the RFID tag on a fixed object. The measurement data can include a location of the fixed object.

Referring to FIG. 9, the method 900 includes detection of an RFID tag associated with a position of interest (910) using a surveying tool (e.g., surveying tool 800). The RFID tag may be detected by transmitting an interrogation signal and receiving a response signal from the RFID tag. In one embodiment, detection of the RFID tag may include a polling process in which multiple responses are received and filtered based on the data included in the response signals. Data encoded in the RFID tag may be decoded by the RFID positioning system (912). Decoded data may be stored in a memory (e.g., memory 112 or database 222). The decoded data may be presented by a surveying tool display (914) for viewing by an operating or the surveying tool.

It should be appreciated that the specific steps illustrated in FIG. 9 provide a particular method of presenting data to an operator of a surveying tool according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 10:
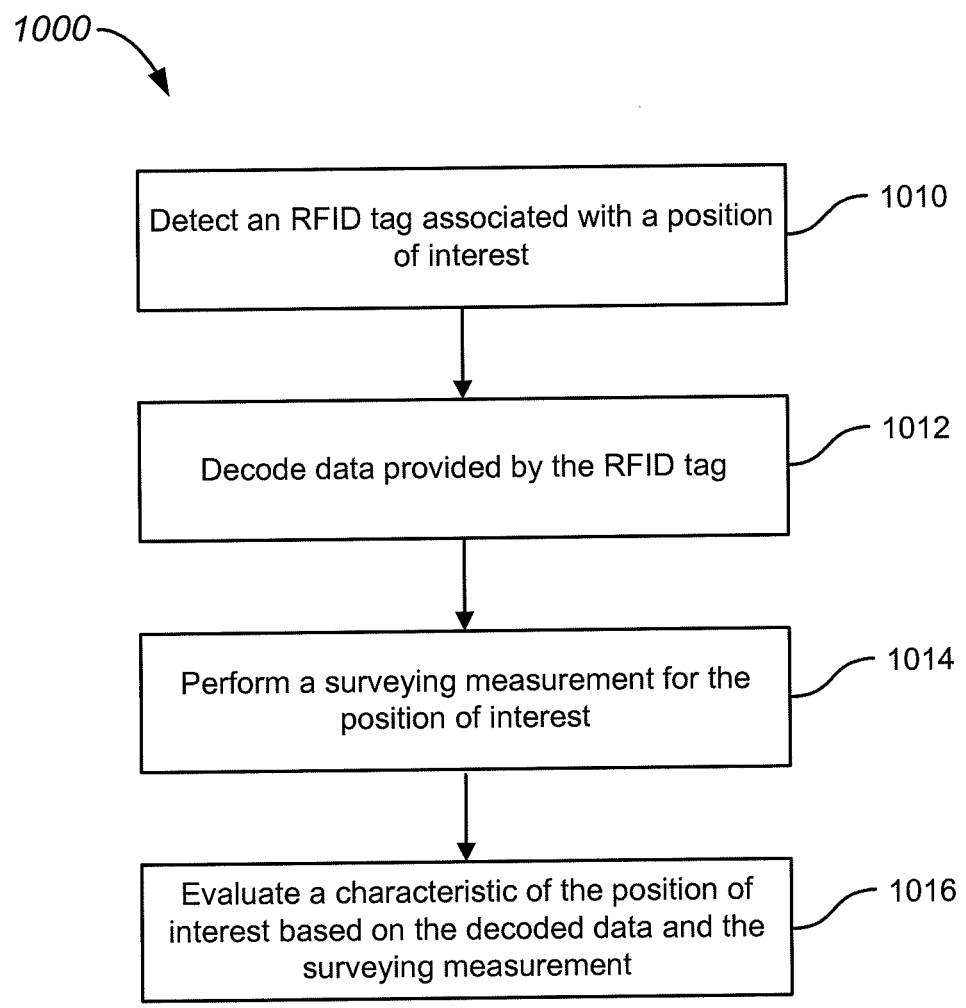
FIG. 10 is a simplified flowchart illustrating a method of determining position information using an RFID tag and a surveying tool according to an embodiment of the present invention.

FIG. 10 is a simplified flowchart illustrating a method of determining position information using an RFID tag and a surveying tool according to an embodiment of the present invention. Referring to FIG. 10, the method 1000 provides a process for monitoring a position of interest according to one embodiment of the invention. The method 1000 may be initiated by detecting an RFID tag associated with a position of interest (1010) using a surveying tool (e.g., surveying tool 800). Data provided by the RFID tag (e.g., in response to an interrogation signal) may be decoded by the surveying tool or other appropriate processor (1012). A surveying measurement can be performed for the position of interest (1014) to determine an elevation, grade, or spatial position of the position of interest. The surveying measurement may be compared to data decoded from the RFID tag to determine any movement or changes associated with the position of interest. In that fashion, method 1000 may be used to monitor earth movement or other movement. In an example embodiment, structures along the path of a railway are monitored for movement using method 1000.

It should be appreciated that the specific steps illustrated in FIG. 10 provide a particular method of determining position information using an RFID tag and a surveying tool according to an embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Embodiments of the present invention provide enhancements to workflows by being able to automatically detect, read, and integrate data into surveying measurements without having to use a pencil and paper to copy the data. These workflow improvements improve accuracy and speed and are useful in a wide variety of surveying applications. RFID tags can provide a more robust system in comparison with techniques utilizing barcodes, which can be obscured by dirt or other materials and may not be in an orientation to be easily read. One of ordinary skill in the art would recognize many variations, modifications, and alternatives.

Moreover, embodiments utilizing RFID tags provide advantages compared to barcode based systems since the alignment of an RFID tag reader need only be generally in a straight line between the reader and RFID tag. For a barcode reader, this is needed plus the barcode itself and the reader itself need to be in much more of a "head-to-head" alignment. Tilting of the reader plane from the same orientation as the barcode plane is possible, and works better when the reader is a few inches away from the barcode, but tilting deteriorates the reading ability as the distance increases. As mentioned above, the efficiency with which a barcode is read depends on the visibility of the barcode, which can be obscured by dirt or otherwise made less visible. In some embodiments described herein, barcode scanning proves to be impractical or unworkable whereas RFID readers are well suited, for example in moving applications in which the data stored in the RFID tag is read by the moving rail trolley with a significant separation (e.g., measured in meters, for example over a meter, 2-5 meters, 6-10 meter, or over 10 meters of separation) between the moving rail trolley and the RFID tags. In addition to other benefits, RFID tags provide benefits in comparison to barcode system in applications in which the reader is moving since the radio waves do not require the direct line of sight needed by barcode systems.

While the present invention has been described with respect to particular embodiments and specific examples thereof, it should be understood that other embodiments may fall within the spirit and scope of the invention. The scope of the invention should, therefore, be determined with reference to the appended claims along with their full scope of equivalents.

What is claimed is:

1. A method of determining a gauge and a tilt of a rail track at a location, the method comprising:
providing a rail trolley including a processor, a memory coupled to the processor, an RFID reader, a gauge sensor, and a tilt sensor;
positioning the rail trolley on the rail track at the location;
interrogating one or more RFID tags positioned along the rail track;
determining, using the processor, a fixed location associated the one or more RFID tags based on interrogating the one or more RFID tags;
determining a distance between the location and the fixed location associated with the one or more RFID tags, wherein determining the distance between the location and the fixed location associated with the one or more RFID tags comprises using a laser; and
determining the gauge and tilt of the rail track at the location of the rail trolley, wherein determining the gauge and tilt of the track includes:
determining, using the gauge sensor, a distance between rails of the rail track and;
determining, using the tilt sensor, an elevation difference between rails of the rail track.

2. The method of claim 1 wherein the one or more RFID tags are attached to a surveyed structure associated with the rail track.

3. The method of claim 1 further comprising:
storing the gauge and tilt of the rail track at the location in the memory;
positioning the rail trolley on the rail track at a second location;
determining, using the processor, the second location of the rail trolley;
determining the gauge and tilt of the rail track at the second location; and
storing the gauge and cant of the rail track at the second location in the memory.

4. The method of claim 3 wherein determining the second location of the rail trolley comprises measuring a distance from the location to the second location.

5. The method of claim 1 wherein determining a fixed location associated with each of the one or more RFID tags comprises determining a GPS coordinate location associated with each of the one or more RFID tags.

6. The method of claim 1 wherein determining the location of the rail trolley in relation to the fixed location associated with each of the one or more RFID tags comprises using a photogrammetry system.

7. A rail trolley comprising:
a mechanical platform;
a processor mechanically coupled to the mechanical platform;
a memory coupled to the processor;
an RFID positioning system mechanically coupled to the mechanical platform;
a distance measurement system mechanically coupled to the mechanical platform, wherein:
the distance measurement system is configured to determine a distance between the mechanical platform and a fixed location;
the fixed location is away from the rail; and
the distance measurement system comprises a laser;
a gauge sensor mechanically coupled to the mechanical platform, wherein the gauge sensor determines a distance between rails of a rail track; and
a tilt sensor mechanically coupled to the mechanical platform, wherein the tilt sensor determines an elevation difference between rails of the rail track.

8. The rail trolley of claim 7 wherein the distance measurement system comprises an optical system and the RFID positioning system is operable to determine a position of one or more optical targets associated with an RFID tag.

9. The rail trolley of claim 7 wherein the rail trolley is operable to move along a railroad track, the rail trolley further comprising an odometer mechanically coupled to the mechanical platform and the railroad track.

10. The rail trolley of claim 7 further comprising a communications module coupled to the processor.

11. The rail trolley of claim 7 wherein the laser is operable to measure a distance to an optical target associated with an RFID tag.

12. The rail trolley of claim 7 wherein the distance measurement system comprises a photogrammetry system.

13. The rail trolley of claim 7 further comprising a camera system mechanically coupled to the mechanical platform and operable to obtain images of an area surrounding the rail trolley.

* * * * *